United States Patent
Jacob et al.

(10) Patent No.: US 9,122,513 B2
(45) Date of Patent: *Sep. 1, 2015

(54) METHOD AND APPARATUS FOR EFFICIENT EXECUTION OF CONCURRENT PROCESSES ON A MULTITHREADED MESSAGE PASSING SYSTEM

(71) Applicant: International Business Machines Corporation, Armonk, NY (US)

(72) Inventors: Arpith C. Jacob, Dobbs Ferry, NY (US); Jude A. Rivers, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

This patent is subject to a terminal disclaimer.

(21) Appl. No.: 13/687,702

(22) Filed: Nov. 28, 2012

(65) Prior Publication Data

US 2014/0137130 A1 May 15, 2014

Related U.S. Application Data

(63) Continuation of application No. 13/675,099, filed on Nov. 13, 2012.

(51) Int. Cl.
*G06F 9/46* (2006.01)
*G06F 9/44* (2006.01)
*G06F 9/48* (2006.01)

(52) U.S. Cl.
CPC ...... *G06F 9/46* (2013.01); *G06F 8/314* (2013.01); *G06F 9/4881* (2013.01); *G06F 2209/483* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 6,757,786 B2 | 6/2004 | Metayer et al. | |
| 8,108,653 B2 | 1/2012 | Lerner et al. | |
| 8,381,203 B1 * | 2/2013 | Beylin et al. | 717/150 |
| 2005/0235266 A1 | 10/2005 | Oara et al. | |

(Continued)

FOREIGN PATENT DOCUMENTS

EP 0533373 A2 3/1993

OTHER PUBLICATIONS

Office Action dated Jun. 6, 2014, received in U.S. Appl. No. 13/675,098.

(Continued)

*Primary Examiner* — Emerson Puente
*Assistant Examiner* — Dong Kim
(74) *Attorney, Agent, or Firm* — Scully, Scott, Murphy & Presser, P.C.; Jennifer Davis, Esq.

(57) ABSTRACT

A graph analytics appliance can be employed to extract data from a graph database in an efficient manner. The graph analytics appliance includes a router, a worklist scheduler, a processing unit, and an input/output unit. The router receives an abstraction program including a plurality of parallel algorithms for a query request from an abstraction program compiler residing on computational node or the graph analytics appliance. The worklist scheduler generates a prioritized plurality of parallel threads for executing the query request from the plurality of parallel algorithms. The processing unit executes multiple threads selected from the prioritized plurality of parallel threads. The input/output unit communicates with a graph database.

23 Claims, 15 Drawing Sheets

(56) References Cited

U.S. PATENT DOCUMENTS

| | | | |
|---|---|---|---|
| 2007/0074218 | A1 | 3/2007 | Levy et al. |
| 2008/0189251 | A1 | 8/2008 | Branscome et al. |
| 2009/0077011 | A1* | 3/2009 | Natarajan et al. ............. 707/2 |
| 2011/0040771 | A1 | 2/2011 | Gilyadov et al. |
| 2011/0119245 | A1* | 5/2011 | Sargeant et al. ............ 707/706 |
| 2011/0213936 | A1 | 9/2011 | Miura |

OTHER PUBLICATIONS

"Chapel: Making Large-Scale Parallel Programming Productive" Cray, Inc., http://www.cray.com/Programs/Chapel.aspx (retrieved on Jul. 19, 2012 at 2:22pm).

Li, S. et al., "A Heterogeneous Lightweight Multithreaded Architecture" IEEE International 2007 Parallel and Distributed Processing Symposium (Mar. 26-30, 2007) pp. 1-8.

Wen, X. et al., "A Case Study of Ways for Reconciling Parallelism and Locality for Many-Cores" University of Maryland Institute for Advanced Computer Studies (UMIACS).

Tan, G. et al., "A Study of Parallel Betweenness Centrality Algorithm on a Manycore Architecture" CAPSL Technical memo 77 (Jun. 27, 2007) pp. 1-28.

Attiya, H., "Invited Talk: The Inherent Complexity of Transactional Memory and What to Do About It" PODC'10 (Jul. 25-28, 2010) Zurich, Switzerland pp. 1-5.

* cited by examiner

ALGORITHM 1: Asynchronous computation at a vertex

Input: A vertex v and a value *in-val* received on an incoming edge

1. *new_val* ← *v.val* ⊕ *in_val*
2. If *new_val* ≠ *v.val* then
3.    *v.val* ← *new_val*
4.    for $e \in$ *v.out_edges* do
5.       *flo_val* ← $flo_{v,e}$(*v.val*)
6.       # send *flo_val* to *e.target_vertex*
7.    end
8. end

FIG. 5A

ALGORITHM 2: Synchronous computation at a vertex

Input: A vertex *v* and a value *in-val* received on an incoming edge

1. If *v.visited ≠ true* then
2.     *v.val* ← *v.val* ⊕ *in_val*
3.     If ++*v.edges_rcvd* = *v.n_in-edges* then
4.       *v.visited* ← true
5.       for *e* ∈ *v.out_edges* do
6.         If !*e.target_vertex.visited* then
7.           *flo_val* ← $flo_{v,e}(v.val)$
8.           # send *flo_val* to *e.target_vertex*
9.         end
10.      end
11.    end
12. end

FIG. 5B $$flo_{v,e}(val) : val + 1$$
$$ebb : minimum \quad (1)$$

$$flo_{v,e}(val) : val + e.weight(\geq 0)$$
$$ebb : minimum \quad (2)$$

$$flo_{v,e}(val) : \frac{\frac{.15}{|V|} + .85 \times val}{v.n\_out\_edges}$$
$$ebb : + \quad (3)$$

FIG. 5C

ALGORITHM 3: A program template in an abstraction

Iterate over supersteps
1. for $s \in 1, ..., n$ do
      # get initial work
2.    WorkSet WS ← $Prologue_s$
      # Process WS in parallel
3.    parallel for $e \in$ WS do
4.       $B(e)$
5.    end
      # barrier synchronization between supersteps
6.    wait WS.empty()
7.    $Epilogue_s$
8. end

FIG. 6

METHOD AND APPARATUS FOR EFFICIENT EXECUTION OF CONCURRENT PROCESSES ON A MULTITHREADED MESSAGE PASSING SYSTEM

RELATED APPLICATIONS

This application is a continuation of U.S. patent application Ser. No. 13/675,099, filed Nov. 13, 2012, which is related to a copending application Ser. No. 13/675,098, filed Nov. 13, 2012, the entire contents and disclosures of which are incorporated herein by reference.

BACKGROUND

The present disclosure generally relates to heterogeneous computer computation and appliances, and a computational framework for fine-grained multi-threaded message passing that exploits data parallelism in irregular algorithms. Specifically, the present disclosure relates to a fine-grained multi-threaded message passing apparatus that can efficiently exploit data parallelism in irregular algorithms, and can be paired and used as an appliance with medium to high-end general purpose server systems.

Though systems like Cray's MTA multi-threaded architectures are designed to execute irregular algorithms more efficiently than traditional computer architectures, these systems tend to be for large scale supercomputing and have hard-to-use programming abstractions. The present disclosure provides for an apparatus to be used with general purpose server systems and an easy-to-use programming abstraction, but provides the fine-grained multi-threaded message passing that efficiently exploits data parallelism.

Memory bound and irregular algorithms may not fully and efficiently exploit the advantages of conventional cache memory-based architectures. Furthermore, the cache memory and other overheads associated with general-purpose processors and server systems contribute to significant energy waste. Examples of such algorithms include graph processing algorithms, semantic web processing (graph DBMS), and network packet processing.

With single-core clock frequency remaining stagnant as power constraints have limited scaling, it has become imperative that irregular algorithms will be better served in parallel multiple core processing environments. Programs need to be rewritten to run in parallel on multicore architectures to meet performance objectives. However, there is as yet no efficient, popular, parallel programming abstraction that a programmer can use productively to express all kinds of program parallelism. Furthermore, it isn't clear that traditional shared-memory homogeneous multicores can continue to scale exponentially over the next decades while maintaining the current power-performance budget. Recent trends suggest that asymmetric and heterogeneous multicores with application-specific customizations and even fixed-function accelerators will be required to meet power-performance goals.

These algorithms tend to have large amounts of irregular data-parallelism that is nevertheless difficult for conventional compilers and microprocessors to exploit.

BRIEF SUMMARY

A graph analytics appliance can be employed to extract data from a graph database in an efficient manner. The graph analytics appliance includes a router, a worklist scheduler, a processing unit, and an input/output unit. The router receives an abstraction program including a plurality of parallel algorithms for a query request from an abstraction program compiler residing on computational node or the graph analytics appliance. The worklist scheduler generates a prioritized plurality of parallel threads for executing the query request from the plurality of parallel algorithms. The processing unit executes multiple threads selected from the prioritized plurality of parallel threads. The input/output unit communicates with a graph database.

According to an aspect of the present disclosure, a method for extracting data from at least one graph database according to a query request is provided. An abstraction program including a plurality of parallel algorithms for a query request is generated by an abstraction program compiler and transmitted to a router. A worklist scheduler generates a prioritized plurality of parallel threads for executing the query request from the plurality of parallel algorithms. A processing unit executes multiple threads selected from the prioritized plurality of parallel threads. A thread that requires an input/output operation is routed to an input/output unit configured to communicate with a graph database on which the query request operates.

According to another aspect of the present disclosure, an apparatus is provided, which includes a graph analytics appliance configured to extract data from at least one graph database according to a query request. The graph analytics appliance includes a router configured to receive an abstraction program including a plurality of parallel algorithms for a query request from at least one computational node; a worklist scheduler configured to generate a prioritized plurality of parallel threads for executing the query request from the plurality of parallel algorithms; a processing unit configured to execute multiple threads selected from the prioritized plurality of parallel threads; and an input/output unit configured to communicate with a graph database. The processing unit is configured to route a thread that requires an input/output operation to the input/output unit.

BRIEF DESCRIPTION OF THE SEVERAL VIEWS OF THE DRAWINGS

FIG. 5A shows an algorithm for the computation that executes at every invocation of a vertex asynchronously.

FIG. 5B shows an algorithm for the computation that executes at every invocation of a vertex synchronously.

FIG. 5C illustrates examples of flo and ebb functions for breadth first search (1), single source shortest path (2), and page rank (3).

FIG. 6 presents a program template in an abstraction according to an embodiment of the present disclosure.

DETAILED DESCRIPTION

Figure 1A:
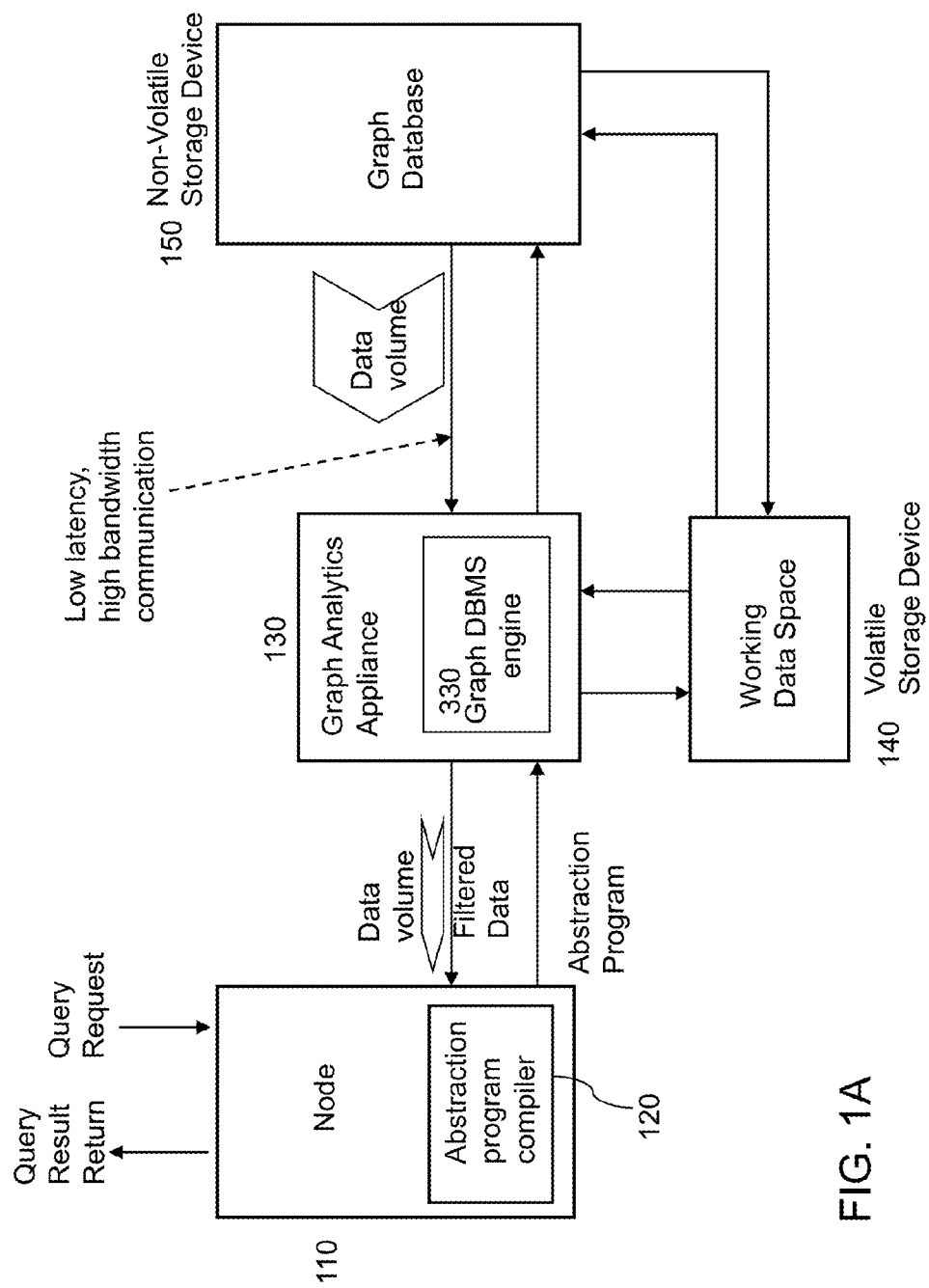
FIG. 1A is a schematic illustration of an exemplary graph database management system for providing an accelerated query on a graph database that provides filtered data according to an embodiment of the present disclosure.

As stated above, this disclosure relates to a fine-grained multithreaded message passing apparatus that can efficiently exploit data parallelism in irregular algorithms, and can be paired and used as an appliance with medium to high-end general purpose server systems. To achieve such a framework, a method employing an abstraction program is provided to describe parallelism in irregular data-parallel algorithms that can be efficiently exploited by a compiler to execute on the apparatus of the present disclosure. Aspects of the present disclosure are now described in detail with accompanying figures. It is noted that like reference numerals refer to like elements across different embodiments. The drawings are not necessarily drawn to scale.

Data analytics on linked or graph data is becoming extremely important in the business and scientific communities. Examples of linked data include: person to person relationships, protein/chemical networks, metabolic pathways, linked webpages, semantic web resource description framework (RDF) data, telephone call records, credit card transactions, user to internet protocol addresses of websites visited, visitor advertisements, etc. In particular, linked or graph data is rapidly exploding on the web, especially with the advent of social networks and media.

These graph analysis applications include detecting cliques or subgraph matching in protein homology networks, recommending points of interest, discovering musical entities through relationships, mining biomedical pathways, exploring research communities, analyzing streaming sensor data such as Twitter™ feeds, and matching display ads to users in low latency advertising exchanges. It is expected that the storage of linked data and efficient extraction of information from it, i.e., the online analysis of linked data, is bound to have important social, business and commercial implications.

Conventional processors are power and performance inefficient for graph analytics due to i) poor data locality, resulting in limited reuse of data and rendering on-chip cache memory expensive; ii) synchronization and sharing requirements between threads across sockets, potentially degrading performance due to coherence overhead; and iii) high data access-to-computation ratios, due to high latency from the central processing memory to the main memory.

Furthermore, performance falls precipitously if the graph is stored in or overflows to conventional storage media beyond main memory (such as redundant array of independent disks (RAID) or flash memory) because the network link bandwidth between the general-purpose processor and storage media can be extremely limited, causing a major bottleneck. Overcoming these challenges require hardware support to hide latency, algorithm-specific modifications to minimize locking, and non-portable program customizations applied on a case-by-case basis. Despite these optimizations, inefficiencies may still remain. The present disclosure seeks to propose an appliance for accelerating a graph database management system as well as graph algorithm-based analytics systems.

While graph analytics can be executed on an FPGA-based appliance for accelerating relational database management systems, it remains an unnatural fit and expensive computational endeavor. This is because the fundamental operation in a graph algorithm is edge traversal. Edge traversal is an expensive join operation on tables in FPGA-based appliances for accelerating relational database management systems or conventional relational database management (RDBMS) systems paradigm. Hence, graph analytics cannot be efficiently accelerated in any of the traditional database systems currently available.

A popular standardized format for storing graph data on the web is the Resource Description Framework (RDF). The fundamental data structure in the format is a <subject, predicate, object> triple, i.e., a representation of a graph edge between the subject and object computational nodes labeled by a predicate. The semantic web project by Bizer et. al., *The story so far*, Int. J. Semantic Web Inf. Syst. Vol. 5, Issue. 3, pp. 1-22, has led to the adoption of RDF by a large group of actors including various governmental organizations, life sciences companies, media organizations, libraries, and others. Recent analysis estimates a 53× increase in RDF tuples between 2007 and 2010. If this rapid growth trend continues, the computational storage and analysis of graph data is bound to emerge as a significant challenge.

Structured Protocol And Resource description framework Query Language (SPARQL) is a W3C standardized language developed to analyze linked data on the web. SPARQL is a declarative language, similar to SQL for relational databases that can be used to execute simple graph pattern matching queries. More capable extensions of the language allow description of rich subgraph patterns as queries.

An appliance to accelerate graph database management and graph analytic systems is provided according to an embodiment of the present disclosure. In one embodiment, graph processing, i.e., edge traversal and subgraph matching queries, is abstracted through a high-level SPARQL program extension and the resulting modified queries are then offloaded to a specialized engine close to storage for execution.

In one embodiment of the present disclosure, a specialized appliance system is provided that can efficiently accelerate edge traversal, executing queries represented in the current SPARQL language plus an abstraction extension of the language. This targeted abstraction language is herein referred to as X*, which can be a superset of the current SPARQL language. In one embodiment, the appliance, incorporating a special-purpose (which could be an FPGA-based or ASIC-based) processing engine attached to a storage device, will then traverse edges in the stored graph data and only select vertices and edges that pass certain matching criteria. Only the small matching subset of vertices and edges would be returned to the requesting computational node client. The appliance can be placed before the traditional main memory or after the traditional main memory, and is placed before a storage device (such as RAID, flash memory, etc.).

The abstraction program compiler can be resident within a graph analytics appliance (or an "appliance" in short) within a computational node that is the host originating the graph algorithmic query. If the abstraction facility is resident at the host processor with SPARQL, then the resulting query that is sent over the link network to the appliance is already in the form that the appliance understands and executes directly. If the abstraction program compiler is resident within the appliance, then the query sent from the host over the link network to the appliance will be the traditional SPARQL and the necessary primitive extensions. The query is then compiled and transformed by the abstraction program compiler and executed on the processing engine in the appliance.

The abstraction language and processing engine adopted in the present disclosure can be employed in conjunction with a graph database management and a graph analytics appliance. The resulting appliance will significantly boost performance, increase power efficiency, and provide better system throughput. In one embodiment of the present disclosure, it is possible to execute analytics queries on large graphs and receive a response at significantly lower latencies than currently possible, providing a competitive advantage for emerging online applications such as advertising exchanges.

Figure 1B:
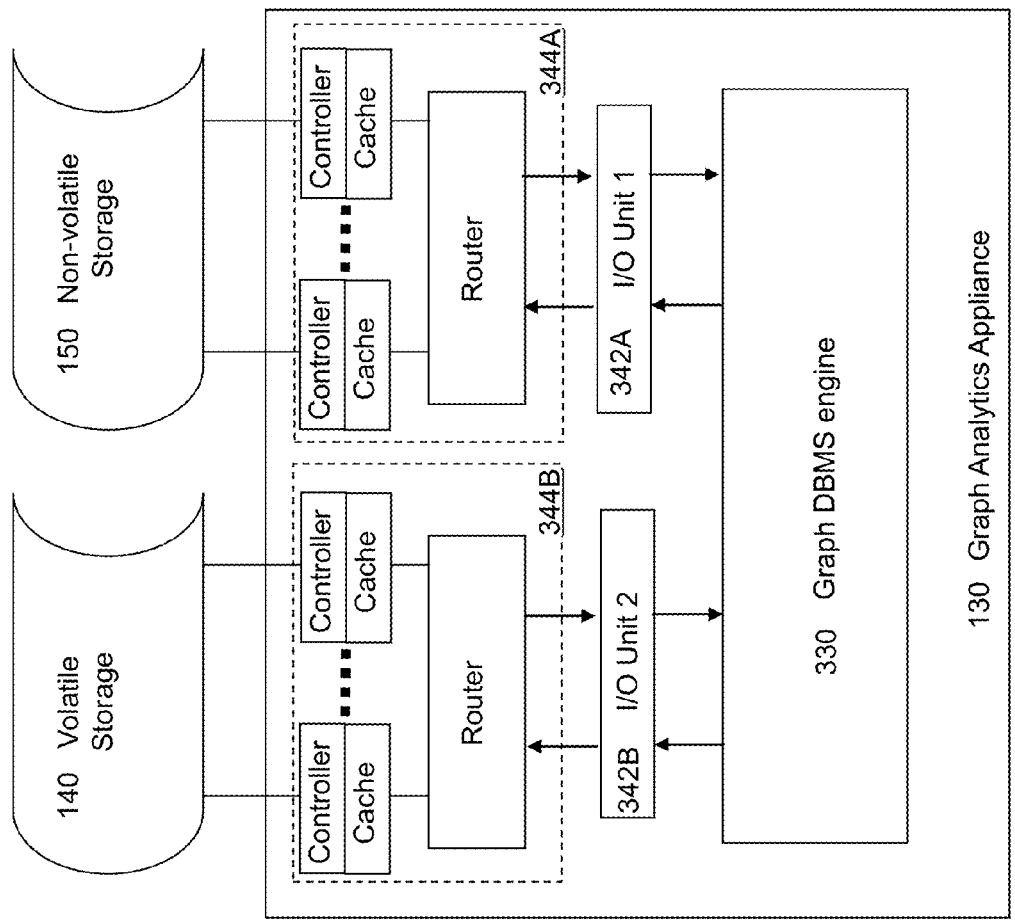
FIG. 1B is a schematic illustration of internal components of a graph analytics appliance according to an embodiment of the present disclosure.

Referring to FIGS. 1A and 1B, a pictorial representation of an apparatus according to an embodiment of the present disclosure is shown. The system includes a computational node 110, which can be a general purpose computational node modified with the installation of an abstraction program compiler 120. The system further includes a graph database 150, which is embodies in a non-volatile storage device, i.e., a data storage device that preserves data indefinitely even in case of a disruption to the power supply thereof. The system further includes a volatile data storage device 140, i.e., a data storage device that loses data in case of a disruption to the power supply thereof. The volatile storage device 140 functions as a working data space for a graph analytics appliance 130, which analyzes data fetched from the graph database 150. For example, the volatile data storage device can be a static random access memory (SRAM) device.

The computational node 110 can be in a standalone computer or in a server suite. The computational node 110 generates or receives a query request on a graph database, which is herein referred to as a graph database query. In one embodiment, the query request can be in the SPARQL format. The computational node 110 forwards the query request to a graph analytics appliance 130 in the form of an abstraction program, which is herein referred to as the X* program. An abstraction program compiler residing in the computational node 110 compiles and transforms the query request, which can be a SPARQL query, into a form understandable by the graph analytics appliance 130, which is an analytics engine.

The abstraction program compiler 120 is an abstraction facility, i.e., an analytics engine appliance, and as such, could either be resident and running on the computational node 110 or resident and running on the graph analytics appliance 130.

The graph analytics appliance 130 is located close to the graph database 150 in terms of data accessibility and communication bandwidth. The graph analytics appliance 130 continues to fetch the necessary data from the graph database 150 into the working data space provided in the volatile storage device 140, while continuously working on the fetched data to compute the appropriate subsets of the graph stored in the graph database 150 to be sent back to the computational node 110 in response to the query request (as an answer to the query request). In one embodiment, the volatile storage device 140 can be incorporated within the graph analytics appliance 130.

The computational node 110 includes one or more processor units therein, and is configured to receive or generate a query request. The abstraction program compiler 120 can reside on the computational node 110 or on the graph analytics appliance. The abstraction program compiler 120 is configured to generate an abstraction program from the query request. The abstraction program includes programming instructions for performing parallel operations on graph data. The graph analytics appliance 130 is configured to receive the abstraction program from the computational node 110. Further, the graph analytics appliance 130 is configured to fetch data from the graph database 150 according to instructions in the abstraction program. Yet further, the graph analytics appliance 130 is configured to run the abstraction program on the fetched data to generate filtered data. The data volume of the filtered data is less in data volume than the data volume of the fetched data. As used herein, data volume is measured in the total number of bytes representing the corresponding data. The graph analytics appliance 130 is configured to return the filtered data to the computational node 110 as an answer to the query request.

The volatile storage device 140 is in communication with the graph analytics appliance 130, and is configured to store therein the fetched data from the graph database 150. In one embodiment, the graph analytics appliance 130 can be configured to fetch data directly from the graph database 150 and to subsequently store the fetched data in the volatile storage device 140. Alternately or additionally, the graph analytics appliance 130 can be configured to fetch data from the graph database 150 through the volatile storage 140 into the graph analytics appliance 130. Further, the volatile storage device 140 can be configured to store at least one temporary data structure generated from the fetched data prior to generation of the filtered data.

In one embodiment, the graph analytics appliance 130 can be configured to generate a plurality of input/output (I/O) requests to the graph database 150. The graph analytics appliance 130 includes a graph database management system (DBMS) engine 330. The graph DBMS engine 330 includes at least one processing unit therein, and is configured to receive the abstraction program from, and to transmit the filtered data to, the computational node 110.

Figure 2:
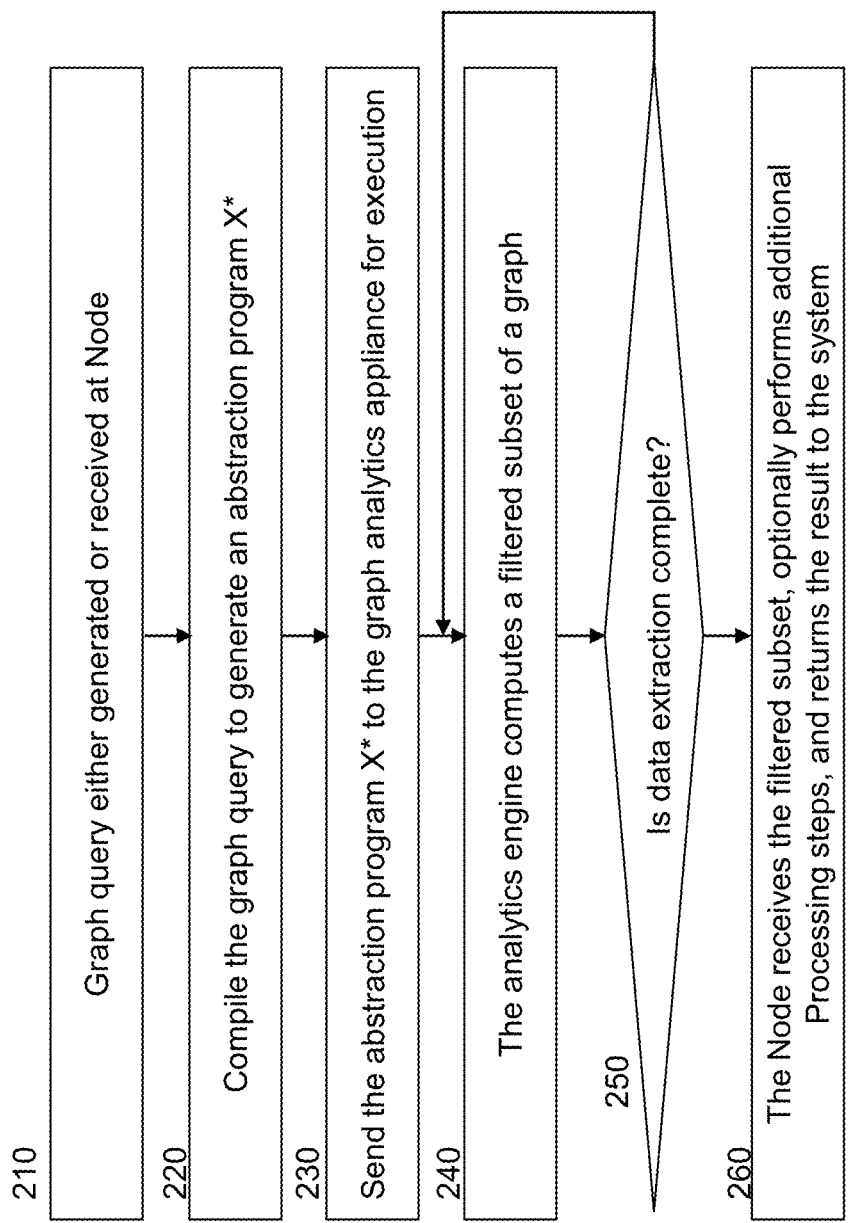
FIG. 2 is a flow chart illustrating the operational steps during a graph analytic query employing the exemplary graph database management system of the present disclosure.

As shown in FIG. 2, the graph analytics appliance 130 can include a first input/output unit 342A configured to receive input/output (I/O) requests from the graph DBMS engine 330, and a first set of I/O peripheral devices 344A configured to relay the I/O requests between the first I/O unit 342A and the graph database 150. The volatile storage device 140 is in communication with the graph analytics appliance 130 and configured to store the fetched data therein. The graph analytics appliance 130 can further includes a second input/output unit 342B configured to receive additional input/output (I/O) requests from the graph DBMS engine 330, and a second set of I/O peripheral devices 344B configured to relay the additional I/O requests between the second I/O unit 342B and the volatile storage device 140.

The computational node 110 can be configured to receive the query request in a form of a structured query language (SQL). Further, the abstraction program compiler 120 can be configured to generate the abstraction program in an assembly language for execution on at least one processing unit in the graph analytics appliance 130. In one embodiment, each of the at least one processing unit can be a reduced instruction set computing (RISC) processor unit.

The graph analytics appliance 130 is provided with a first communication channel having a first bandwidth for data transmission between the computational node 110 and the graph analytics appliance 130, and is provided with a second communication channel having a second bandwidth for data transmission between the graph database 150 and the graph analytics appliance 130. The second bandwidth is greater than the first bandwidth. In one embodiment, the second bandwidth is greater than the first bandwidth at least by a factor of 10. For example, the second bandwidth can be greater than the first bandwidth by many orders of magnitude.

In one embodiment, the fetched data from the graph database 150 may be stored in a combination of volatile and non-volatile storage media instead of being stored in a single volatile storage device 140. Thus, the volatile storage device 140 may be substituted with a combination of volatile and non-volatile storage media. Further, the data generated by the graph analytics appliances 130 may be stored in non-volatile storage, either because they are too large to fit in main memory or for long term persistent storage. Non-volatile storage devices, e.g. a flash memory, typically has high capacity, high bandwidth, low access time, and the ability to service large number of concurrent I/O requests as compared to rotating disk media configurations such as SATA (Serial Advanced Technology Attachment) RAID. Note that the use of the (FPGA-based or ASIC-based) graph database processing engine attached directly to the storage media alleviates the bottleneck network link between the storage media and the computational node, because only the vertices and edges matching a query are returned.

The computational node 110 can receive or generate a SPARQL query and forward it on to the graph analytics appliance 130. The graph analytics appliance returns filtered data, but not whole graph segments that cover the scope of the query request. Thus, the data volume of the filtered data returned to the computational node 110 is much less than the data volume of whole graph segments that cover the scope of the query request, which is transferred from the graph database 150 to the graph analytics appliance. In contrast, prior art query methods require direct transmission of the whole graph segments that cover the scope of the query request from a graph database to a computational node, which results in a large data movement into a computational node and requires a long processing time.

In one embodiment, the abstraction program compiler 120 can be located at the computational node 110 or within the graph analytics appliance 130. The abstraction program can be a compiled SPARQL query that has been transformed into the appliance format, i.e., a format such as an assembly language that can be utilized by the graph DBMS engine 330. The graph DBMS engine 330 fetches the necessary data from the graph database 150 while continuously working on the data to compute the minimal appropriate subset of the graph data (i.e., the minimal data that corresponds to the final result of the query request) to send back to the computational node 110 as an answer to the query request. In one embodiment, minimal data that corresponds to the final result of the query request is returned to the computational node 110. Thus, the computational node 110 can merely receive the filtered data without a need to further extract additional data for the query request. Thus, the volume of the data from the graph analytics appliance 130 to the computational node 110 can be relatively small, and the data transfer can be performed in a short time period.

Referring to FIG. 2, a flowchart illustrates a typical graph analytic query through the apparatus of FIGS. 1A and 1B. Referring to step 210, a graph query, i.e., a query to extract data from a graph database, is generated or received at a computational node 110 (See FIG. 1A).

Referring to step 220, the graph query is compiled to generate the abstraction program X* employing an abstraction program compiler 120, which can reside on the computational node 110 or on the graph analytics appliance 130. The abstraction program includes programming instructions for performing parallel operations on graph data to be fetched from the graph database 150 to the graph analytics appliance 130 and the volatile storage device 140.

Referring to step 230, the abstraction program is sent to the graph DBMS engine 330 for execution. The data is fetched from the graph database 150 to the graph analytics appliance 130 and/or the volatile storage device 140 according to instructions in the abstraction program.

Referring to step 240, the graph DBMS engine 330 runs the abstraction program to perform the algorithms encoded within the abstraction program on the fetched data. The graph DBMS engine 330 iteratively computes a filtered subset of whole graph segments that cover the scope of the query request which are transferred from the graph database 150 to the graph analytics appliance 130 and/or the volatile storage device 140. The DBMS engine generates filtered data of a volume that is less than the volume of the entire fetched data that resides in the volatile storage device 140 or in the graph analytics appliance 130.

Referring to step 250, the graph DBMS engine 330 checks if the data extraction is complete. If not, the graph DBMS engine continues the data extraction at step 240.

Referring to step 260, once the data extraction is complete, the filtered data, which is the final result of the query request, is transferred from the graph analytics appliance 110 to the computational node as an answer to the query request.

In an embodiment of the present disclosure, a programming abstraction representing programs that operate on a graph data structure is provided. In one case, a graph may be provided as an input at runtime, and may not be available at compile time. The graph may be distinct from the program, for example, a person-to-person network, or it may be derived from a program, for example, a control flow graph.

A graph includes a set of vertices V, which is herein interchangeably referred to as computational nodes. An edge set E $\subseteq V \times V$ is defined between the vertices. The graph may be undirected or directed, and may contain cycles. A vertex or an edge may have attributes, which we represent using the dot notation. The fundamental attribute that the abstraction operates on is v.val, for a vertex v in V of some user-defined value type val_t.

Figure 3:
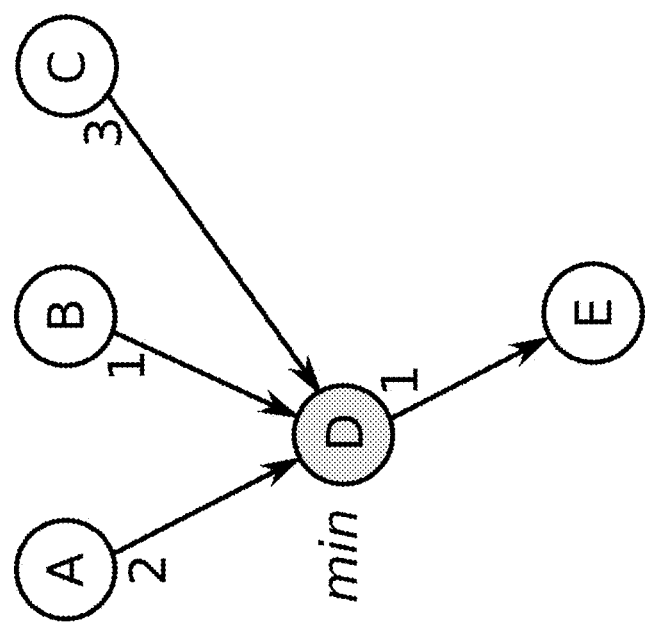
FIG. 3 schematically illustrates a computation over a directed graph with five vertices, A to E.

For the purpose of illustration, a simple example of a computation over a directed graph is considered. Referring to FIG. 3, a graph with vertices labeled A to E is shown. The integer value at each directional edge of the graph is the result of a computation at a vertex that corresponds to the starting point of the vertex. Each integer value is then sent as a message along a vertex's outgoing directional edge to the end point of the directional edge. In the initial state, the val attribute of every vertex is initialized to some integer value. During the computation phase, each vertex receives one input value at all of its incoming edges, computes the minimum of these values, and sends the result along every outgoing edge.

There is some parallelism in this computation. For example, vertices A, B, and C may be processed in parallel, however, vertices D and E must be processed sequentially. In order to simplify synchronization, the model requires that an operation on a vertex v must modify that vertex's attribute(s) only. Data sharing between vertices requires sending messages along edges. In an embodiment of the present disclosure, a programming abstraction is provided that implicitly enforces these two requirements and transparently exploits any parallelism available in the graph structure.

In an embodiment of the present disclosure, computation at a vertex may, or may not, be synchronized. Thus, all of a vertex's input values may, or may not, be available before the minimum computation is allowed to proceed.

For illustrative purposes, suppose the first value available at vertex D is 1, received from vertex B. The first available value may be compared to the initial value (in this case a large integer). The algorithm can then decide to send the resulting minimum, 1, along the outgoing edge D→E. This message may in turn trigger computation at vertex E, which proceeds "speculatively." At some subsequent time the integers 2 and 3 are received at vertex D, which are compared to the most recent result of the minimum computation. Since the two integers are larger, no subsequent messages are sent along the edge D→E. In this case, speculative execution results in a faster program completion time, and the overhead of synchronization at a vertex can be avoided.

Computations that operate on a graph without requiring synchronization at a vertex are herein referred to as asynchronous algorithms. See, for example, Pearce et al., *Multithreaded asynchronous graph traversal for in-memory and semiexternal memory*, Proc. 2010 ACM/IEEE International Conference for High Performance Computing, Networking, Storage and Analysis. SC '10. pp. 1-11 (2010). Such asynchronous algorithms for breadth first search and connected components run 1.6× to 13× faster than algorithms that synchronize at vertices.

Figure 4:
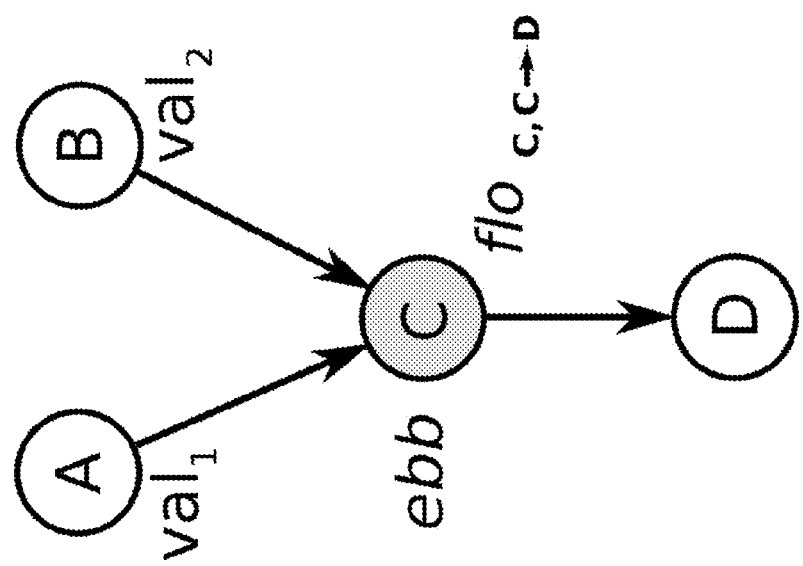
FIG. 4 illustrates two primitives flo and ebb for vertex C.

For illustrative purposes, consider functional flo and ebb as two primitive operations on graph data. The function $flo_{u,u\to v}$:val_t→val_t is defined for each vertex u and an outgoing edge u→v. It takes a vertex value and returns a value without maintaining state. The ebb primitive defines a binary operator $\oplus$ that operates on vertex values. ebb is applied to all incoming values (as well as the initial value) of a vertex and the result is stored in the val attribute of the vertex. All vertices' val attributes are assumed to be initialized to the identity of $\oplus$. The two primitives are shown in FIG. 4 for vertex C.

In general, the abstraction program can include a plurality of parallel threads for running the requested query. Each of the plurality of parallel threads includes an instruction for operating on no more than one vertex in a graph in the graph database. The plurality of parallel threads can include first threads configured to operate on a single vertex and at least one edge in the graph (such as the ebb primitive) and second threads configured to operate only on a single vertex in the graph (such as the flo primitive). In one embodiment, each thread can correspond to a unique vertex in the fetched graph data.

FIG. 5A shows the computation that executes at every invocation of a vertex in the asynchronous case (Algorithm 1). The input to the algorithm is a vertex v and one incoming value in_val. Line 2 of FIG. 5A ensures that a message is sent along a vertex's outgoing edges only if its val attribute has been updated by the incoming edge.

Referring to the processing step of line 1 of Algorithm 1, the ebb function is applied to both the incoming value in_val and the vertex's current value v.val, and the result is stored in a temporary, new_val. Referring to the processing step of line 2 of Algorithm 1, further processing continues only if the computation in the previous step produces a new result (update), otherwise, the algorithm terminates. Referring to the processing step of line 3 of Algorithm 1, the program updates the vertex's value v.val with the new result new_val. Referring to the processing step of line 4 of Algorithm 1, the program loops through all the vertex's outgoing edges, communicating the update. Referring to the processing step of line 5 of Algorithm 1, the flo function, possibly specialized (parametrized) by the vertex and edge, is applied to the new result. Referring to the output step of line 6 of Algorithm 1, the result of the flo function from the previous step is communicated to the vertex v's neighboring vertex.

Algorithm 2 in FIG. 5B shows the synchronous case. A reference count v:edges_rcvd is used to wait until all incoming values have been received. A v:visited Boolean is also used to avoid sending messages along a cycle. Note that, in both algorithms of FIGS. 5A and 5B, it is assumed that the ebb operator is associative and commutative. Appropriate modifications are required if these properties are not satisfied.

Referring to the processing step of line 1 of Algorithm 2, when an incoming value is received at a vertex, processing at that vertex is required only if it has not been visited; this is verified by inspecting the visited field of the vertex. Referring to the processing step of line 2 of Algorithm 2, the ebb function is applied to both the incoming value in_val and the vertex's current value v.val, and the vertex's value v.val is updated with the new result. Referring to the processing step of line 3 of Algorithm 2, further processing at this vertex continues only if similar updates have been received from all of the vertex's incoming edges, otherwise, the algorithm terminates. Referring to the processing step of line 3 of Algorithm 2, if the algorithm has received updates from all of its incoming edges, mark it as visited. Referring to the processing step of line 5 of Algorithm 2, the program loops through all the vertex's outgoing edges, communicating the update. Referring to the processing step of line 6 of Algorithm 2, the update is sent to an outgoing vertex only if it has not been visited. This check eliminates spurious work, for example, by ensuring that an update is not sent on an outgoing edge from the vertex to itself. Referring to the processing step of line 7 of Algorithm 2, the flo function, possibly specialized (parametrized) by the vertex and edge, is applied to the vertex value. Referring to the output step of line 3 of Algorithm 2, the result of the flo function from the previous step is communicated to the vertex v's neighboring vertex.

Both algorithms of FIGS. 5A and 5B execute serially. However, the same computation may execute concurrently on one or more distinct vertices. In one embodiment, this can be the primary means of exploiting irregular data-parallelism using the abstraction method of the present disclosure. The vertex's val attribute is updated without the use of locks, so the runtime must ensure that only one thread operates on a particular vertex at any time. The algorithms enforce an owner-computes rule, where the unique thread that owns (or is assigned to) a particular vertex's data is the one and only one that modifies its value after any associated computation. Due to this property, we are guaranteed that there will never be concurrent updates to the same vertex's data. Because vertex values of neighbors are sent as messages, no other locking mechanism is required to ensure correctness.

FIG. 5C shows examples of flo and ebb functions for breadth first search (1), single source shortest path (2), and page rank (3). It is possible to run breadth first search and single source shortest path asynchronously; page rank must use the synchronous algorithm.

The defined abstraction program can be used to describe irregular data-parallel programs. As used herein, a worklist is defined as an ordered multiset that holds active vertices, i.e., those vertices that require processing. One or more vertices may be added into the worklist during processing of some active vertex. In particular, Lines 6 and 8 of Algorithms 1 and 2 (FIGS. 5A and 5B) respectively add a vertex into the worklist. A vertex is removed from the worklist for processing by a processor. Multiple processors may perform addition and removal operations concurrently on the worklist. It is assumed that there is some mechanism in the implementation of the worklist to ensure consistency.

Vertices in the worklist are ordered by a priority value specified during addition. The priority does not encode a dependency constraint. Instead, the priority specifies a desired execution order that may, for example, speedup convergence of the algorithm, lead to improved data reuse, reduce the maximum size of the worklist at runtime, or in the case of asynchronous algorithms, control speculative execution. Although an implementation may attempt to execute the worklist in prioritized order, this is not guaranteed by the semantics. Hence, a vertex must be added into the worklist only when one or more of its dependencies have been satisfied as is done by the two algorithms in Algorithms 1 and 2 (FIGS. 5A and 5B). Dependent (message) data is specified in a message packet and is associated with a vertex when it is added into the worklist.

Vertices in a worklist may be executed in parallel as follows:

parallel for (e∈Worklist) do B(e)

where B(e) is either Algorithm 1 or 2.

In one embodiment, a particular data structure can be used to efficiently implement the aforementioned abstraction. A worklist W is implemented as a list of n priority queues $Q_i$, $1 \leq i \leq n$, such that $W = \cup_{i=1}^{n} Q_i$, and $Q_i \cap Q_j = \phi$ for $i \neq j$. A vertex v is added to the queue specified by i=hash(v), where hash is a uniform hash function. Thereafter, elements from each queue may be removed independently. Therefore, prioritized execution is not enforced between vertices in distinct queues. This allows a more efficient implementation of the worklist abstraction. The uniform hash function can be used to distribute work equally among the n queues.

In one embodiment, a program can be written as a serial execution of parallel operations on a graph specified by loops of the kind described above (e.g., "parallel for (e∈Worklist) do B(e)"). A parallel loop terminates when the worklist is empty and the system reaches quiescence. This model of execution can be represented compactly as serial executions of loop iterations, called supersteps, as shown in FIG. 6 in Algorithm 3.

Referring to the processing step of line 1 of Algorithm 3, the program is divided into n supersteps that are stepped through serially. Each step is represented by the loop variable s. Referring to the processing step of line 2 of Algorithm 3, the workset WS, which is empty, has to be populated with an initial set of vertices (for example, the root of a tree). This initial set of vertices is computed by the Prologue function, which may be parametrized by s. Referring to the processing steps of lines 3-5, vertices in the workset WS are processed using a parallel for loop to achieve high performance. The computation in line 4 is applied to every vertex in the workset. This computation may in turn add new vertices to the workset. Referring to the processing step of line 6 of Algorithm 3, the synchronization construct in this line waits until all vertices in the workset have been processed and no new vertex is added into the workset. Referring to the processing/output step of line 7 of Algorithm 3, an epilogue stage may aggregate the results and send them to the user for display.

Such an iterative model, called Bulk Synchronous Parallel (BSP), was proposed by Valiant, *A bridging model for parallel computation*, Commun. ACM 33, pp. 103-111 (199) in order to represent parallel computations. In the BSP model, iterations of the loop are executed serially while the loop body executes in parallel. However, the loop body is composed of two distinct phases that run sequentially. In the computation phase, processors operate in parallel on their local data while in the communication phase there is an exchange of data between processors in preparation for the next superstep. Thus, computation never overlaps with communication. In contrast with the iterative model by Valiant, however, computation and communication are allowed to proceed concurrently in an embodiment of the present disclosure.

A characteristic of the abstraction program according to an embodiment of the present disclosure is implicit synchronization through the enforcement of the owner-compute's rule and data sharing via message passing. As used herein, "data sharing via message passing" refers to a method of communicating shared data generated by a producer thread with one or more consumer threads. In a message passing scheme the producer sends this shared data via one or more messages to the consumers; thus an expensive locking mechanism is not required to ensure consistency. By employing partitioning the vertex computation in this abstraction into a flo and ebb phase, better efficiency can be achieved, for example, in reference counting, through message reduction. As used herein, a "flo" phase refers to an atomic unit of computation on a vertex value that is possibly parametrized by a vertex and an edge. Examples of flo phases are shown in FIG. 5C. As used herein, a "ebb" phase refers to a binary operator on vertex values. Examples of ebb phases are shown in FIG. 5C.

Having described a programming abstraction to represent irregular algorithms, we next introduce a microprocessor architecture to efficiently execute these algorithms. Graph computation patterns depend on runtime data such as a vertex's outgoing edges, making it difficult for conventional compilers to automatically extract and exploit parallelism from a sequential description of a graph algorithm. Since graphs are typically unstructured and irregular, for example, having a varying number of edges at every vertex, it is difficult to optimally partition computation between cores, limiting scalability. The irregular structure of a graph also limits data locality, which leads to less than ideal performance on conventional cache-backed processors. The fundamental operation in many graph algorithms is graph traversal, and because the computational intensity on a single vertex can be minimal, the data access to computation ratio is higher than regular data-parallel algorithms.

In contrast with methods known in the art, an architecture that addresses the disadvantages of such shared-memory general-purpose processors is provided according to an embodiment of the present disclosure. The distance that data is moved (from disk or DRAM to the ALU) on general-purpose systems leads to considerable energy inefficiency and will likely consume a significant fraction of the power budget of future microprocessors. The long latency to storage necessitates oversubscribing system cores with threads, which may in turn pressure other components of the system (such as coherence traffic), and requires exploiting more concurrency in the application. In the architecture provided by an embodiment of the present disclosure, computation is moved close to storage in terms of data accessibility, improving energy efficiency and eliminating any system bottleneck due to a low bandwidth link to the traditional microprocessor.

Depending on the algorithm and data organization, traditional caches may not be fully exploited. For example, if an edge is associated with multiple attributes, a path traversal algorithm will likely not hit a single cache line more than once, leading to wasted memory bandwidth. This does not mean that there is no data locality that can be exploited, for example, at the page level granularity. Use of large caches could still reduce traffic to the storage controller but a purpose-built solution may be able to make better use of cache resources. The methods of the present disclosure can be particularly useful for algorithms that spend a majority of their time fetching data. The architecture according to an embodiment of the present disclosure can benefit from high-speed context switching of threads. Further, a message passing architecture can be employed to avoid synchronization overhead during data sharing.

Figure 7:
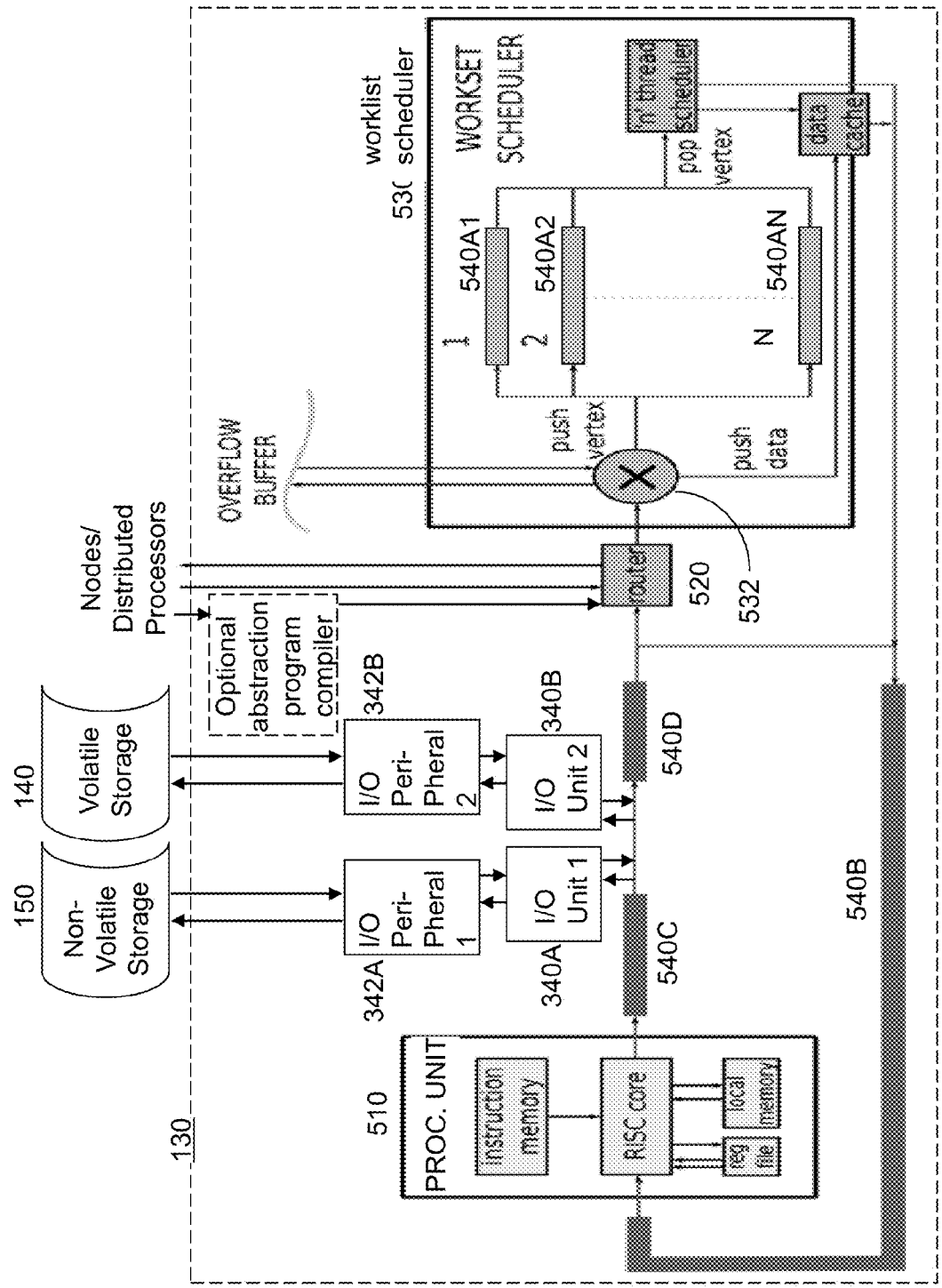
FIG. 7 illustrates an exemplary appliance for implementing a multi-threaded message passing architecture for irregular algorithms according to an embodiment of the present disclosure.
Figure 8:
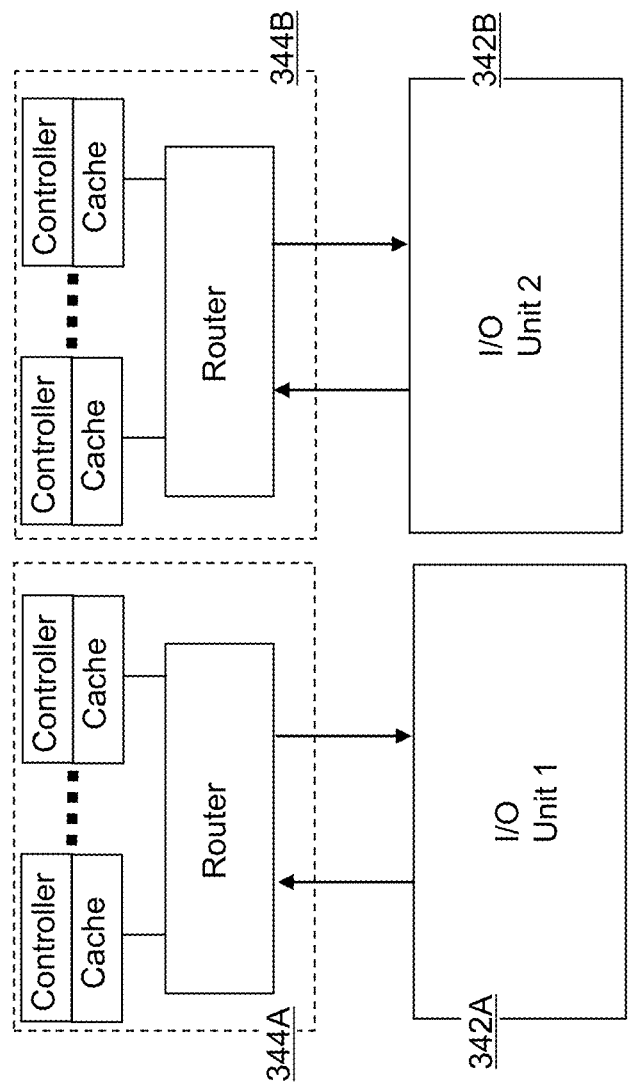
FIG. 8 illustrates input-output units and input-output peripheral devices according to an embodiment of the present disclosure.

Referring to FIGS. 7 and 8, a graph analytics appliance 130 configured to extract data from at least one graph database according to a query request is illustrated. The graph analytics appliance 130 illustrates the organization for a single-chip processor architecture containing a processing unit 510, a first I/O unit 340A, a second I/O unit 340B, and a worklist scheduler 530. Thread contexts are streamed between the three units and the architecture supports single-cycle context switch of threads.

In one embodiment, the graph analytics appliance 130 may not include an operating system, and only a single program may be allowed to reside in programmable memory during the lifetime of a computation. Multiple threads run independently, executing instructions from the single programmable memory in the processing unit 510. When the processing unit 510 encounters an I/O instruction, or an instruction that operates on the worklist, the corresponding thread is switched out for a new one. No facility for explicit synchronization of threads is provided in the architecture.

The router 520 is configured to receive an abstraction program including a plurality of parallel algorithms for a query request from at least one computational node 110 (See FIG. 1A) or the abstraction program compiler residing in the graph analytics apparatus 130. The worklist scheduler 530 is configured to generate a prioritized plurality of parallel threads for executing the query request from the plurality of parallel algorithms. The processing unit 510 is configured to execute multiple threads selected from the prioritized plurality of parallel threads. The first input/output unit 340A is configured to communicate with a graph database 150. The processing unit 510 is configured to route a thread that requires an input/output operation to the first input/output unit 340A.

The processing unit 510 is configured to route a thread that encounters a push operation to the worklist scheduler 530. Specifically, the processing unit 510 can be configured to stop execution of the thread that encounters the push operation prior to routing the thread to the worklist scheduler 530. Further, the worklist scheduler 530 can be configured to add an instruction to a target thread of the push operation for implementing the push operation.

In one embodiment, the processing unit 510 is configured to continue to execute each thread among the multiple threads until completion, until an encounter with a push operation, or until an encounter with an input/output operation. In one embodiment, completion of the thread, an encounter with a push operation within the thread, or an encounter with an input/output operation in the thread can be the only set of conditions for stopping the execution of each thread in the processing unit 510.

The abstraction program includes a plurality of irregular data parallel algorithms for parallel operation on a plurality of vertices and edges of a graph in the graph database. In one embodiment, each thread among the plurality of parallel threads corresponds to one of the plurality of irregular data parallel algorithms, and includes instructions to be performed on no more than one vertex within the graph. In one embodiment, the plurality of parallel algorithms can include first algorithms configured to operate on a single vertex and at least one edge in the graph, and second algorithms configured to operate only on a single vertex in the graph.

The abstraction program compiler can reside in the at least one computational node 110 or in the graph analytics appliance 130, and is configured to generate the abstraction program from the query request. In one embodiment, the abstraction program compiler can be configured to generate, within the abstraction program, functions to be executed in the plurality of parallel algorithms. The functions (primitives) can include a first class of functions that determines a data value for a vertex from at least one edge adjoining the vertex in the graph (such as the ebb primitive discussed above), and a second class of functions that transmit a data value at a first vertex to a second vertex in the graph (such as the flo primitive discussed above). The abstraction program can be in an assembly language for execution in the processing unit.

The worklist scheduler 530 includes a thread selector 532 configured to select N number of independent threads from among threads for executing the plurality of parallel algorithms and any additional threads routed from the processing unit 510. The worklist scheduler 530 can further include a thread scheduler, or an "'n' thread scheduler" configured to store the selected N number of independent threads, and a data cache configured to store data values for edges of the graph that the N number of independent threads operate on. The N number of independent threads can be operated by employing a push vertex operation for adding a new thread and a pop vertex operation for forwarding the thread to the processing unit 510.

The processing unit 510 is configured to route a thread that encounters a push operation to the thread selector 532 through the router 520. The thread selector 532 is configured to repeatedly determine and assign a highest priority work-vertex and data to a next available thread among N number of independent threads.

The processing unit generates a message passing instruction upon encounter with a push operation that requires passing of a data value to another thread, which corresponds to a different vertex in the fetched graph data. The worklist scheduler 530 adds the message passing instruction to a queue of threads from which the prioritized plurality of parallel threads is generated.

The first input/output unit 340A is configured to transmit input data from the graph database 150 to the router 520 upon receipt of the input data from the graph database 150. The router 520 is configured to subsequently transmit the input data to the worklist scheduler 530.

Each thread includes a thread context. A thread context, i.e., the context of a thread, includes a thread identifier, a priority value, a program counter referencing instruction memory, a status word, and a list of data items. The thread context is streamed between the various units in hardware queues (540A1, 540A2, ..., 540AN, 540B, 540C, 540D) represented by the thick lines in FIG. 7. The architecture allows a maximum of N threads, which is selected to balance the computation with the data access latency. The number N is selected based on the profiles of applications that will run on the processor, the properties of the storage media, and the desired performance. The hardware does not guarantee any execution order among the threads. However, the hardware can be configured to make a best effort attempt to execute threads in prioritized order to improve performance. To achieve this, the hardware queues are priority queues rather than simple first-in first-out.

The first input/output unit 342A is configured to receive input/output (I/O) requests from the processing unit 510. The first set of I/O peripheral devices 344A is configured to relay the I/O requests between the I/O unit and the graph database 150.

The volatile storage device 140 is in communication with the graph analytics appliance 130 and configured to store data therein. In one embodiment, the volatile storage device 140 can be configured to store at least one temporary data structure generated from the processing unit 510. A second input/output unit 342B is configured to receive additional input/output (I/O) requests from the processing unit 510. A second set of I/O peripheral devices 344B is configured to relay the additional I/O requests between the second I/O unit 342B and the volatile storage device 140 as illustrated in FIG. 8.

Figure 9:
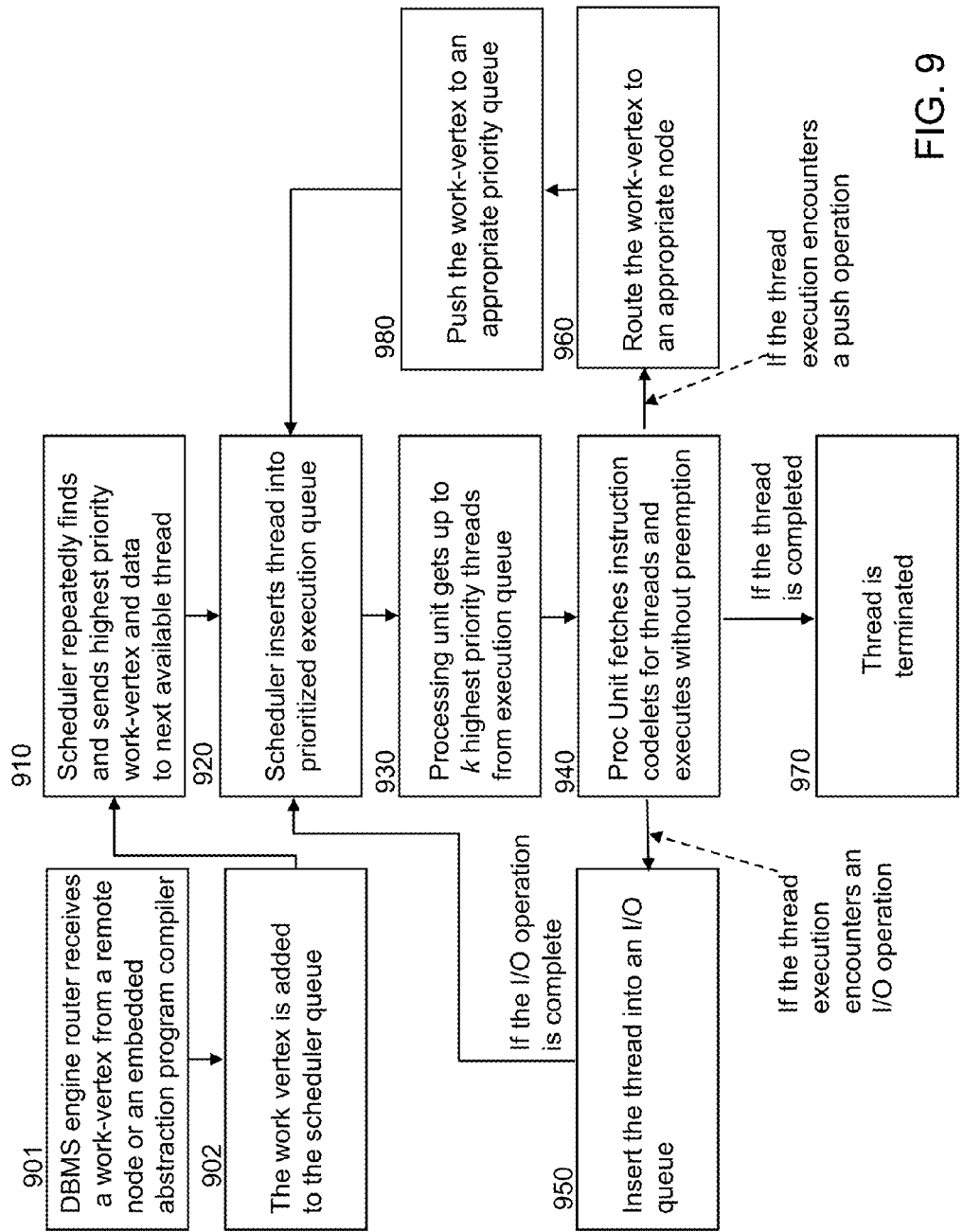
FIG. 9 is a flow chart illustrating various steps during computation employing a single-chip processor and a multithreaded message passing architecture for irregular algorithms according to an embodiment of the present disclosure.

Referring to FIG. 9, a flowchart illustrates steps that can be employed to operate the apparatus according to embodiments of the present disclosure. Referring to step 901, the router 520, which is a local computational node router in the graph analytic appliance 130, receives an abstraction program including a plurality of parallel algorithms for a query request from at least one computational node 110 (See FIG. 1A) or an embedded abstraction program compiler (See FIG. 7). Each algorithm in the plurality of parallel algorithms corresponds to a work-vertex. As used herein, a "work-vertex" refers to a vertex from the graph that is ready for processing by the system.

Referring to step 902, each work-vertex is pushed into hardware queues in the worklist scheduler 530 as described above.

Referring to step 910, a prioritized plurality of parallel threads for executing the query request from the plurality of parallel algorithms is generated employing the worklist scheduler 530. Thus, the worklist scheduler 530 repeatedly finds and sends highest priority work-vertex and data to the next available thread.

Referring to step 920, the worklist scheduler 530 inserts the selected thread into a prioritized execution queue.

Referring to step 930, multiple threads selected from the prioritized plurality of parallel threads are executed in the processing unit 510 (See FIG. 7). Specifically, the processing unit 510 gets up to k highest priority threads from the execution queue in the worklist scheduler 530.

Referring to step 940, the processing unit 510 fetches instruction codelets for threads and executes them without preemption. Each thread may be executed to completion and be done at step 970, or may be interrupted due to encountering an input/output (I/O) operation or a push operation. In other words, each thread among the multiple threads can be executed until completion, until an encounter with a push operation, or until an encounter with an input/output operation at the processing unit 510.

Referring to step 950, if an I/O operation is encountered during the computation, the executing thread (a "suspended" thread thereafter) is inserted into an I/O queue in the first or second I/O units (342A, 342B; See FIGS. 7 and 8) to wait for I/O completion while a different thread is scheduled on the processing unit 510. In one embodiment, the suspended thread that requires an input/output operation is routed to the first input/output unit 342A configured to communicate with the graph database 150 on which the query request operates. On completion of the I/O operation, the suspended thread is inserted back into the prioritized execution queue in the worklist scheduler 530 to continue execution.

Specifically, a suspended thread is switched out of the processing unit 510, and is offloaded into an appropriate I/O queue when the last instruction of the codelet is an I/O operation. The appropriate I/O queue, provided within the first I/O unit 340A or within the second I/O unit 340B, performs a single I/O operation per thread. In general, any I/O unit that can interface with a shared memory and/or a distributed memory embodied in a volatile and/or non-volatile media may be employed. This organizational feature provides application flexibility, and the required performance objectives may be met by suitably managing the number of concurrent threads in the system and the number of cores in the processing unit 510.

The data storage device in communication with the I/O units (340A, 340B) can be organized in multiple banks. In one embodiment, the data storage device can provides a cache at the bank to improve performance, for example, due to data locality when reading a vertex's adjacency list. However, maintaining cache coherency is not required.

In one embodiment, the abstraction program can enforce the owner-compute's rule, and can always read data associated with a particular vertex (all other data is shared via messages). This feature can be exploited to improve the efficiency of the data storage unit. The input graph data structure may be partitioned and stored in the multiple banks using a uniform hash function on the vertices. If every thread processes a distinct set of vertices, data may be partitioned, and an I/O operation may be routed, based on a uniform hash function on the thread identifier. Moreover, a cache may be partitioned into independent sets of cache lines that are local to each thread.

Referring to step 960, if a push operation (which requires transmission of data to another thread) is encountered, the work-vertex is routed to the appropriate node through the router 520 and the worklist scheduler 530, and is added to a work-vertex present within the worklist scheduler 530 or to an overflow buffer. The overflow buffer temporarily stores work-vertices until a queue becomes available in the worklist scheduler 530. The execution of the thread that encounters the push operation is stopped prior to routing the thread to the worklist scheduler 530.

Referring to step 980, the re-routed work-vertex is eventually pushed into an appropriate priority queue in the worklist scheduler 530, and is then inserted back into the prioritized execution queue to continue execution. Thus, a thread that encounters a push operation at the processing unit 510 is routed to the worklist scheduler 530. An instruction for implementing the push operation is added to a target thread of the push operation employing the worklist scheduler 530.

Figure 10:
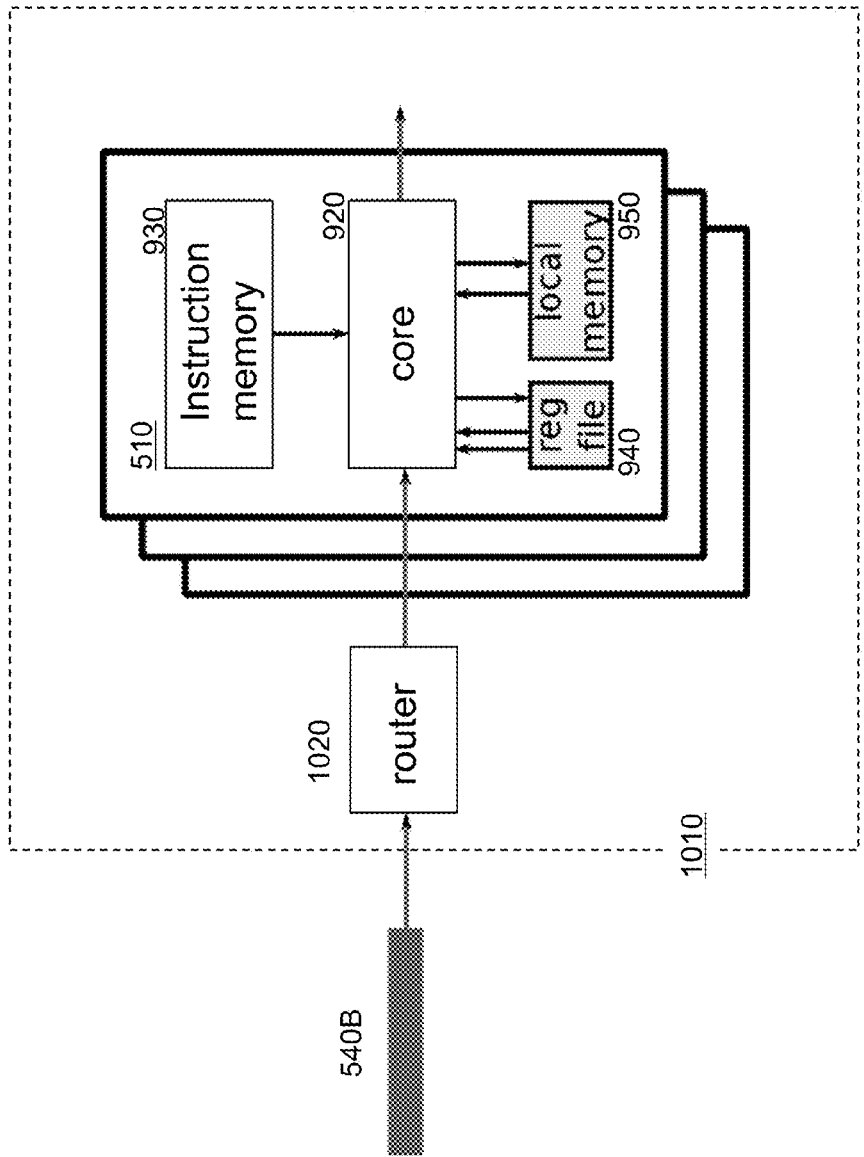
FIG. 10 shows the organization of multiple independently operating processing units that can be employed as a processing unit in an embodiment of the present disclosure.

Referring to FIG. 10, the organization of an assembly 1010 of multiple independently-operating processing units is shown, which can replace a processing unit 510 illustrated in FIG. 7. The assembly 1010 of the multiple independently operating processing units includes a router 1020 and a plurality of processing units 510. Each of the plurality of processing units 510 in the assembly 100 can be identical to the processing unit 510 in FIG. 7. The router 1020 takes thread contexts in priority order and directs them to corresponding cores 920. In one embodiment, a static routing algorithm can be employed. For example, the static routing algorithm may be a uniform hash function on the thread id. This ensures that the router 1020 always sends a particular thread for execution on the same core 920 so that sharing of local memory data between cores is not required.

In one embodiment, each processing unit 510 can include a processing unit, i.e., a core 920, configured to execute the multiple threads. In one embodiment, a plurality of cores 920 can execute different subsets of the multiple threads simultaneously. Each processing unit 510 is configured to execute multiple threads selected from the prioritized plurality of parallel threads.

The cores 920 in the processing unit 1010 can include one or more RISC cores. In general, the cores 920 can be any type of core known in the art. In one embodiment, the cores 920 can be simple single-issue, k-stage pipelined cores with an integer unit. The functional units in the cores 920 can be determined through application profiling. Optionally, a design implemented on a reconfigurable fabric can be customized, for example, with an application-specific instruction implementing a datapath for the flo function. The core interleaves k threads, all executing independent instructions from the programmable memory. In one embodiment, the RISC cores do not provide a stack.

A program is partitioned into distinct codelets, which is a block of serially ordered instructions that can be conceptually thought of as a pure (mathematical) function. The codelet ingests one or more data items and emits output data, maintaining no state. In one embodiment, it may be assumed that all data dependencies of a codelet are available within the processing unit, so that the thread always executes a codelet without preemption. For example, an s-instruction codelet can be executed in exactly ks clocks by the core, the integer k being the number of stages in the pipelined core, which is the same k as defined above. Only the final instruction of a codelet may be an I/O or a worklist operation, in which case the thread is forwarded to the corresponding I/O unit such as the first I/O unit 342A or the second I/O unit 342B. Codelets in a thread always execute sequentially and are automatically generated by a compiler from a program written in our high-level abstraction.

Each core 920 can be associated with an instruction memory 930, a register file 940, and local memory 950. The register file 940 can include k independent sets of registers, one for each of the k threads executing simultaneously on the core. Registers are used for temporary storage during the execution of a codelet but data values are lost once a thread is preempted. A register file with a small number of registers will be sufficient to execute most codelets, but providing a larger number of read and write ports may improve arithmetic intensity of an instruction.

A higher capacity local memory 950, with a single read and write port, can be provided to store data during the lifetime of a thread. The local memory is partitioned into n independent partitions, one for each thread, and is used to share data between codelets executed by the same thread. Any data that must survive past the lifetime of a codelet must be explicitly moved from the register file to local memory. Data that must survive past the lifetime of a thread must be moved from local memory to the storage device through explicit I/O operations. In one embodiment, the compiler can automatically manage this type of data movement. Threads may not share data, either through registers or local memory. The only mechanism the abstraction method of the present disclosure provides for data sharing is through the sending of messages between vertices. Message passing also allows data to be reused on-chip before being retired to off-chip storage.

Figure 11:
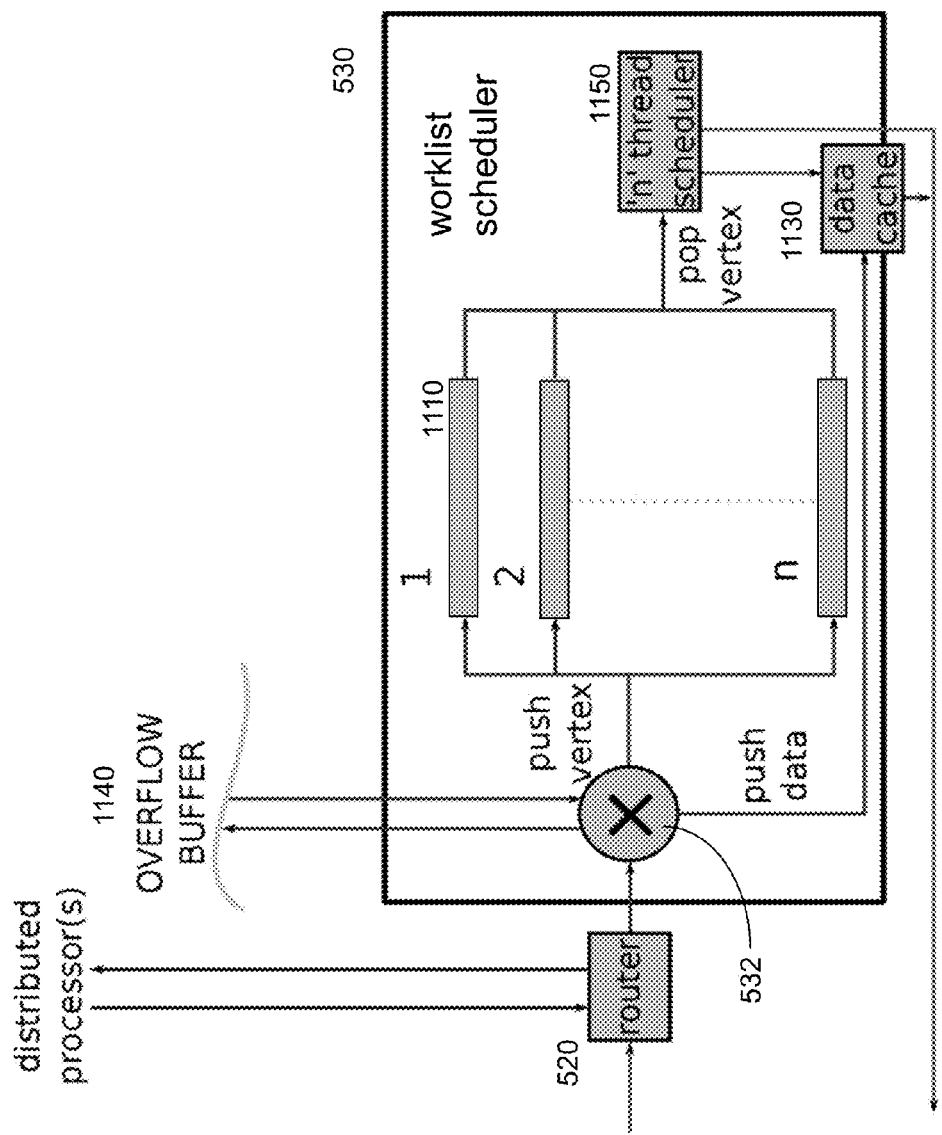
FIG. 11 illustrates an exemplary worklist scheduler unit according to an embodiment of the present disclosure.

FIG. 11 provides a schematic representation of the worklist scheduler 530. The worklist scheduler 530 is a hardware implementation of the worklist abstraction. The worklist scheduler 530 provides support for work allocation and fine-grained message passing between concurrent threads. Rather than operating on individual memory addresses, the worklist scheduler 530 operates at the vertex level, which is the fundamental element in the worklist. The worklist scheduler 530 provides n hardware priority queues 1110, each associated with its own thread. The priority queue is implemented as a systolic array and supports constant time insertion and removal of vertices. A vertex v is added into the priority queue identified by a uniform hash function hash(v). Therefore, every vertex is owned and always processed by the same thread, enforcing the desired owner-computes processing paradigm.

A thread is dispatched to the worklist scheduler 530 if the processing unit 510 encounters a push or an exit instruction.

The push instruction is a message passing primitive, and can be defined as: push (v, priority, PC, data), where v refers to the target vertex, priority is the processing priority of the message, PC is an optional program counter referring to an instruction from which a thread starts processing this vertex, and data is an optional list of data values that are sent to the target vertex. Data values are stored in a data cache 1130 and are shared between messages in the priority queues. This caching mechanism allows efficient on-chip data reuse as the exact lifetime of a data value can be precisely calculated. An off-chip overflow buffer 1140 is provided to store vertices that do not fit in the priority queues. This allows the non-blocking processing of all push requests, which is necessary to avoid deadlocks.

The 'n' thread scheduler 1150 activates a thread when its priority queue is non-empty. However, there may be at most one outstanding thread per queue. An exit instruction completes processing of a message and terminates a thread. Simultaneously, the reference count of any cache lines associated with the thread's vertex is decremented. Thread 0 is reserved for the main process that serially executes the iterative loop. Barrier synchronization is implemented by waiting until all the priority queues have drained and all n threads have become inactive.

The router 520 is attached to the worklist scheduler 530, and intercepts push messages. Based on the vertex identifier and/or the program counter, the router 520 may optionally transmit the message to a remote computational node 110 (See FIG. 1A) for processing. This is the only mechanism provided for inter-computational node communication, but it allows a seamless distributed processing capability (over on-chip cores, chips, or systems). A programmer may use this facility to process a graph that has been partitioned across multiple computational nodes 110, or to execute specialized code, for example, high arithmetic intensity code blocks that can achieve the best performance on traditional cores. Message coalescing will likely be required to achieve good performance. The router 520 also receives the first message from a remote host to activate processing, i.e., to initiate the implementation of the query instruction.

Figure 12:
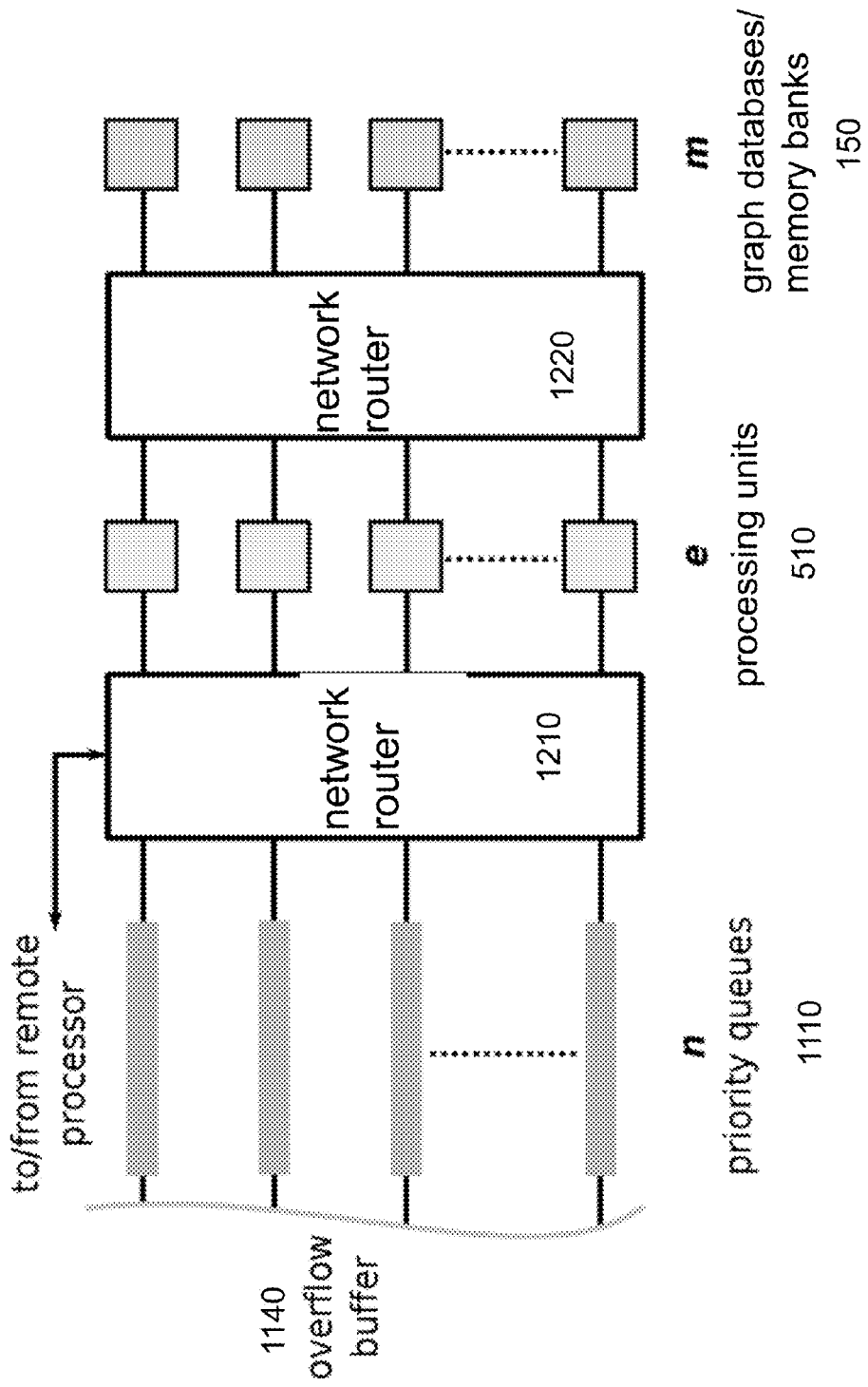
FIG. 12 illustrates a multi-processor multi-database configuration for implementing an embodiment of the present disclosure.

Referring to FIG. 12, a system for extracting data from a plurality of graph databases 150 according to a query request is shown. In this embodiment, the graph analytic appliance can be organized as a single-chip multi-threaded message passing system. A network router 1120 can be configured to provide bidirectional communication paths between the plurality of graph databases 150 and the plurality of processing units 510.

In this arrangement, an array of processing units 510 are connected via a network to an array of graph databases 150 (which can be memory banks) and priority queues 1110. Inter-processor communication via messages is done through the all-to-all network router 1210 that passes through priority queues. Processor-memory traffic is also routed through the network router 1220. However, if a fixed hashing function is used, a processor always communicates with the same distinct subset of graph databases 150, so only a simplified network is required. The networks route threads based on the vertex identifier and are designed for high throughput rather than low latency.

To summarize, the proposed processor architecture according to embodiments of the present disclosure allows only one instruction of a thread to be active in the pipeline at a given time. The system's compiler statically identifies program codelets, which are executed without preemption. This avoids the hardware complexity to support look-ahead as in systems like the Cray XMT described in Feo J., *Eldorado*, Proc. 2nd conference on Computing Frontiers. CF '05. pp. 28-34 (2005), while still improving serial performance. The use of local memory that is persistent over context-switches of the thread reduces off-chip memory accesses, and increases the number of instructions that are executed by a thread on a processor before preemption.

The processor architecture of the present disclosure can support a fixed number of threads. In one embodiment, the proposed architecture also supports the concept of work elements in an ordered set, implemented with thread-specific priority queues. This ensures that there is always enough work for each thread; moreover, it efficiently implements an on-chip list abstraction, which is frequently used by graph algorithms. Work partitioning is done in hardware (instead of a software runtime) using a static algorithm. Such a scheme is expected to achieve good performance on a class of data-parallel algorithms. The concept of a priority is associated with each work element, and consequently, each hardware thread. This allows the user to control system behavior to improve performance (data reuse, faster iterative convergence, controlled speculative execution, etc) using relatively simple, coarse-grained mechanisms (vertex degree, depth, etc.).

The architecture described herein provides a global view of memory to the user, but introduces a number of hardware features to take advantage of locality and reduce traffic over the network to memory without introducing cache-coherence overheads. First, the use of a local store in the processor enables data reuse across codelets of the same thread. The use of the message passing architecture with the on-chip data cache in the worklist scheduler maximizes reuse across threads on-chip, avoiding the need to access the memory network. Synchronization is implicit in the architecture and does not require participation of the memory controller. Memory is organized around vertices of a graph in the architecture, and a memory request is hashed on the vertex identifier of the attribute requested. This achieves the goal of alleviating hot-spotting, while still improving reuse when multiple attributes of the same vertex are accessed in succession.

In one embodiment, the architecture provides fine-grained message passing support. Not only does this enhance data reuse on-chip, but it allows efficient programming of the architecture using synchronization-free abstractions. The programming model according to various embodiments of the present disclosure is based on the push rather than the pull paradigm and data is processed where it is physically located. Since the architecture is organized around a vertex, this allows a more efficient hardware implementation throughout. Since the same set of vertices is processed by the same thread on the same processor, a processor always accesses only a subset of memory banks, simplifying the routing network. Similarly, partitioning, scheduling, and synchronization of a program, as well as data partitioning and organization is centered around the vertex abstraction, decreasing complexity of the system.

The fine-grained multithreaded message passing apparatus described herein efficiently exploits data parallelism in irregular algorithms. Further, the multithreaded architecture for graph processing employs the requirement of "owner computes" so that no expensive synchronization or hardware based work allocation is required. The graph analytics apparatus of the various embodiments of the present disclosure provide a computation engine for accelerating edge traversal by efficiently hiding latency. Further, the graph analytics apparatus of the various embodiments of the present disclosure facilitates subgraph matching (filtering) close to storage to bypass low bandwidth network bottleneck. Thus, only subset of graph is subsequently returned to the computing node that originates a query request. The various embodiments of the present disclosure enable data processing at storage, and thus, reduce latency. Thus, far fewer concurrent threads are required to hide the latency.

While the disclosure has been described in terms of specific embodiments, it is evident in view of the foregoing description that numerous alternatives, modifications and variations will be apparent to those skilled in the art. Various embodiments of the present disclosure can be employed either alone or in combination with any other embodiment, unless expressly stated otherwise or otherwise clearly incompatible among one another. Accordingly, the disclosure is intended to encompass all such alternatives, modifications and variations which fall within the scope and spirit of the disclosure and the following claims.

What is claimed is:

1. An apparatus comprising a graph analytics device configured to extract data from at least one graph database according to a query request, wherein said graph analytics device comprises:
    a router configured to receive an abstraction program including a plurality of parallel algorithms for a query request;
    a worklist scheduler configured to generate a prioritized plurality of parallel threads for executing said query request from said plurality of parallel algorithms;
    a processing unit configured to execute multiple threads selected from said prioritized plurality of parallel threads;
    an input/output unit configured to communicate with a graph database, wherein said processing unit is configured to route a thread that requires an input/output operation to said input/output unit or another input/output unit
    wherein said processing unit is further configured to stop execution of said thread that encounters a push operation prior to routing said thread that encounters said push operation to said worklist scheduler; and
    wherein said worklist scheduler is further configured to add an instruction to a target thread of said push operation for implementing said push operation.

2. The apparatus of claim 1, wherein said processing unit is configured to route said thread that encounters a push operation to said worklist scheduler.

3. The apparatus of claim 1, wherein said processing unit is configured to continue to execute each thread among said multiple threads until completion, until an encounter with said push operation, or until an encounter with said input/output operation.

4. The apparatus of claim 1, wherein said abstraction program comprises a plurality of irregular data parallel algorithms for parallel operation on a plurality of vertices and edges of a graph in said graph database.

5. The apparatus of claim 4, wherein each thread among said plurality of parallel threads corresponds to one of said plurality of irregular data parallel algorithms, and comprises instructions to be performed on no more than one vertex within said graph.

6. The apparatus of claim 4, wherein said plurality of parallel algorithms comprises:
    first algorithms configured to operate on a single vertex and at least one edge in said graph; and
    second algorithms configured to operate only on a single vertex in said graph.

7. The apparatus of claim 1, further comprising an abstraction program compiler residing in said at least one computational node or on said graph analytics appliance and configured to generate said abstraction program from said query request.

8. The apparatus of claim 7, wherein said abstraction program compiler is configured to generate, within said abstraction program, functions to be executed in said plurality of parallel algorithms, said functions comprising:
- a first class of functions that determines a data value for a vertex from at least one edge adjoining said vertex in said graph; and
- a second class of functions that transmit a data value at a first vertex to a second vertex in said graph.

9. The apparatus of claim 7, wherein said abstraction program is in an assembly language for execution in said processing unit.

10. The apparatus of claim 1, wherein said processing unit comprises at least one processing unit configured to execute said multiple threads.

11. The apparatus of claim 10, wherein said at least one processing unit is a plurality of processing units that executes said multiple threads simultaneously.

12. The apparatus of claim 11, further comprising:
- at least another processing unit configured to execute additional multiple threads selected from said prioritized plurality of parallel threads; and
- another router configured to provide communication paths between said graph database and said processing unit and said at least another processing unit.

13. The apparatus of claim 12, further comprising at least another graph database, wherein said another router is configured to provide communication paths between said at least another graph database and said processing unit and said at least another processing unit.

14. The apparatus of claim 1, wherein said worklist scheduler comprises a thread selector configured to select N number of independent threads from among threads for executing said plurality of parallel algorithms and any additional threads routed from said processing unit.

15. The apparatus of claim 14, wherein said worklist scheduler further comprises:
- a thread scheduler configured to store said selected N number of independent threads; and
- a data cache configured to store data values for edges of said graph that said N number of independent threads operate on.

16. The apparatus of claim 14, wherein said processing unit is configured to route a thread that encounters said push operation to said thread selector through said router.

17. The apparatus of claim 14, wherein said thread selector is configured to repeatedly determine and assign a highest priority work-vertex and data to a next available thread among N number of independent threads.

18. The apparatus of claim 1, wherein said processing unit generates a message passing instruction upon encounter with said push operation that requires passing of a data value to another thread, wherein said worklist scheduler adds said message passing instruction to a queue of threads from which said prioritized plurality of parallel threads is generated.

19. The apparatus of claim 1, wherein said input/output unit is configured to transmit input data from said graph database to said router, and said router is configured to subsequently transmit said input data to said worklist scheduler.

20. The apparatus of claim 1, wherein said graph analytics appliance further comprises:
- an input/output unit configured to receive input/output (I/O) requests from said processing unit; and
- a set of I/O peripheral devices configured to relay said I/O requests between said I/O unit and said graph database.

21. The apparatus of claim 20, further comprising a volatile storage device in communication with said graph analytics appliance and configured to store data therein.

22. The apparatus of claim 21, wherein said volatile storage device is configured to store at least one temporary data structure generated from said processing unit.

23. The apparatus of claim 21, wherein said graph analytics appliance further comprises:
- another input/output unit configured to receive additional input/output (I/O) requests from said processing unit; and
- another set of I/O peripheral devices configured to relay said additional I/O requests between said another I/O unit and said volatile storage device.

* * * * *